United States Patent
Kusens et al.

(10) Patent No.: US 10,685,366 B2
(45) Date of Patent: Jun. 16, 2020

(54) USING A WIRELESS TRANSMITTER AND RECEIVER TO PREVENT UNAUTHORIZED ACCESS TO RESTRICTED COMPUTER SYSTEMS

(71) Applicant: COLLATERAL OPPORTUNITIES, LLC, Wilmington, DE (US)

(72) Inventors: Bruce Howard Kusens, North Miami Beach, FL (US); Michael Kusens, Cooper City, FL (US)

(73) Assignee: COLLATERAL OPPORTUNITIES, LLC, Wilmington, DE (US)

( * ) Notice: Subject to any disclaimer, the term of this patent is extended or adjusted under 35 U.S.C. 154(b) by 0 days.

(21) Appl. No.: 15/373,469

(22) Filed: Dec. 9, 2016

(65) Prior Publication Data

US 2017/0109770 A1    Apr. 20, 2017

Related U.S. Application Data

(63) Continuation-in-part of application No. 15/014,776, filed on Feb. 3, 2016.
(Continued)

(51) Int. Cl.
*G06Q 30/02* (2012.01)
*G06K 7/10* (2006.01)
(Continued)

(52) U.S. Cl.
CPC ..... *G06Q 30/0209* (2013.01); *G06K 7/10366* (2013.01); *G06Q 30/0207* (2013.01);
(Continued)

(58) Field of Classification Search
None
See application file for complete search history.

(56) References Cited

U.S. PATENT DOCUMENTS 6,871,063 B1    3/2005  Schiffer
8,376,840 B1 *  2/2013  Adiraju ............... G07F 17/3255
                                                          463/16
(Continued)

FOREIGN PATENT DOCUMENTS

RU    2523113 C1    7/2014

OTHER PUBLICATIONS

Hightower et al. Location Sensing Techniques. Aug. 2001, IEEE Computer Magazine, pp. 57-66. (Year: 2001).*
(Continued)

*Primary Examiner* — William A Brandenburg
*Assistant Examiner* — Christopher C Busch
(74) *Attorney, Agent, or Firm* — Daniel S. Polley, P.A.

(57) ABSTRACT

A method and system for automatically terminating a logout session for a restricted access system by determining that an authorized user has left the vicinity of the restricted access system. The authorized user preferably carries a wireless transmitter which transmits an authorization signal that is also used for permitting access to the restricted access system. When the authorized user leaves the vicinity of the restricted access system after logging in, the signal is no longer received by a wireless receiver or too weak of a signal, such that an access control system in communication with the wireless receiver automatically causes the restricted access system to initiate a logout action in order to prevent or reduce the chance of an unauthorized user gaining access to the restricted access system. The restricted access system can be a rewards tracking system, such as, but not limited to, a rewards tracking system for a gaming machine or gaming table.

10 Claims, 9 Drawing Sheets

Related U.S. Application Data

(60) Provisional application No. 62/111,879, filed on Feb. 4, 2015.

(51) Int. Cl.
| | |
|---|---|
| *H04W 12/08* | (2009.01) |
| *H04B 17/318* | (2015.01) |
| *H04W 4/80* | (2018.01) |
| *H04B 17/27* | (2015.01) |
| *H04W 4/02* | (2018.01) |
| *H04W 12/06* | (2009.01) |
| *G07F 17/32* | (2006.01) |
| *H04W 84/12* | (2009.01) |
| *H04B 5/00* | (2006.01) |
| *H04L 29/06* | (2006.01) |
| *H04W 12/00* | (2009.01) |

(52) U.S. Cl.
CPC ..... *G06Q 30/0236* (2013.01); *G07F 17/3239* (2013.01); *G07F 17/3241* (2013.01); *H04B 17/27* (2015.01); *H04B 17/318* (2015.01); *H04W 4/023* (2013.01); *H04W 4/80* (2018.02); *H04W 12/06* (2013.01); *H04W 12/08* (2013.01); *H04W 12/0802* (2019.01); *H04B 5/0031* (2013.01); *H04L 63/08* (2013.01); *H04L 63/107* (2013.01); *H04L 63/108* (2013.01); *H04W 12/00502* (2019.01); *H04W 84/12* (2013.01)

(56) References Cited

U.S. PATENT DOCUMENTS

| | | | |
|---|---|---|---|
| 8,467,770 | B1 | 6/2013 | Ben Ayed |
| 9,372,252 | B2 | 6/2016 | Larose |
| 9,563,761 | B1* | 2/2017 | Ziraknejad ............. G06F 21/32 |
| 2002/0065625 | A1* | 5/2002 | Xydis .................... G06F 21/35 |
| | | | 702/127 |
| 2006/0133612 | A1 | 6/2006 | Abedi |
| 2010/0205667 | A1 | 8/2010 | Anderson |
| 2010/0299726 | A1 | 11/2010 | Lemke |
| 2011/0314530 | A1 | 12/2011 | Donaldson |
| 2012/0268241 | A1 | 10/2012 | Hanna |
| 2014/0180817 | A1* | 6/2014 | Zilkha .................... G06Q 30/02 |
| | | | 705/14.55 |
| 2014/0230026 | A1 | 8/2014 | Forero |
| 2014/0282945 | A1 | 9/2014 | Smith |
| 2015/0113621 | A1 | 4/2015 | Glickfield |

OTHER PUBLICATIONS

Applicant also notes its co-pending U.S. Appl. No. 14/974,950, filed Dec. 18, 2015 entitled "System and Method for Preventing Unauthorized Access to Restricted Computer Systems Through the Use of a Wireless Transmitter and Receiver".

\* cited by examiner

USING A WIRELESS TRANSMITTER AND RECEIVER TO PREVENT UNAUTHORIZED ACCESS TO RESTRICTED COMPUTER SYSTEMS

This application is a Continuation-In-Part of U.S. application Ser. No. 15/014,776, filed Feb. 3, 2016, which claims the benefit of and priority to U.S. Provisional Patent Application Ser. No. 62/111,879, filed Feb. 4, 2015. Both applications are incorporated by reference in their entireties for all purposes.

FIELD OF THE DISCLOSURE

The present disclosure relates generally to access to restricted computer systems and terminals and more specifically to a system and method for preventing unauthorized access to a logged in restricted computer system or terminal where an authorized user has left the area of the restricted computer system or terminal.

BACKGROUND

Information security is a high priority in today's modern society. System administrators use an array of security measures to prevent unauthorized access to computer systems and terminals. Security measures vary in complexity and effectiveness, ranging from simple usernames and passwords to biometrics, fingerprint and retinal scanners, or combinations of these and more advanced systems. However, even the most secure systems can be vulnerable to tailgating.

Tailgating occurs when an unauthorized person uses an access terminal where an authorized user is logged in. Tailgating is a significant security concern because once an authorized user logs in, most computer systems have no means to differentiate between that authorized user and an unauthorized user who subsequently uses the terminal. If an authorized user forgets to log out, or for example momentarily steps away from a terminal without logging out, an unauthorized person can take the place of the authorized user at the terminal and circumvent the majority of security measures designed to prevent unauthorized system access.

It is to addressing or reducing these problems that the current disclosed embodiments are directed.

SUMMARY OF THE DISCLOSURE

A system and method is described that uses wireless transmitters and receivers to allow a computer system to identify when an authorized user has left the vicinity of an access terminal in order to automatically terminate that user's session, thus preventing unauthorized persons from accessing secured systems.

In another embodiment, a system and method is described that uses wireless transmitters and receivers to allow a computer system to identify when a registered customer has entered or left the vicinity of a location, device or system for which the customer is being tracked for a rewards program in order to initiate and/or terminate a rewards tracking session.

The following definitions are provided for a better understanding of the embodiments described in the instant disclosure:

| Term | Definition |
| --- | --- |
| Access Control File | An electronic file maintained by the system administrator which contains all valid login credentials and their associated authentication signals. |
| Access Control System | An electronic security system which identifies and authenticates users, and limits access to restricted access systems. |
| Access Terminal | A physical terminal where a restricted access system can be accessed. |
| Customer Identification File | An electronic file maintained by the system administrator which contains all valid customers for the rewards program and their associated demographic information and identification signals |
| Rewards Interface System | A computer system which identifies customers and can both initiate and terminate rewards tracking sessions for customers. |
| Rewards Tracking System | A computer system which manages and stores customer rewards account information. |
| Authentication Signal | A digital or electronic code or signal broadcasted by the wireless transmitter unique to and/or associated with an authorized user. |
| Identification Signal | A digital or electronic code or signal broadcasted by the wireless transmitter unique to and/or associated with a registered customer. |
| Authorized User | A person who is permitted to access a restricted access system. This may include, but is not limited to, read/write and/or download ability access to these systems. |
| Registered Customer | A person who is registered with a rewards tracking program for a given organization. |
| Computer System | A computer or network of computers along with any connected hardware, software, or other devices necessary to operate the computer(s). |
| Configurable Signal Strength Threshold | A minimum signal strength broadcasted by the wireless transmitter and received by the wireless receiver below which the authorized user or registered customer is considered to be away from the immediate proximity of the access terminal that the authorized user used to log into the restricted access system or the wireless receiver. |
| Configurable Time Threshold | A maximum amount of time an authorized user or registered customer may be away from the proximity of an access terminal or wireless receiver or the minimum signal strength is not received before the login session or active tracking session is automatically terminated by the access control system or rewards interface system. |
| Login Credentials | What a user or registered customer must know or possess in order to gain entry to a restricted access system or rewards tracking program. Non-limiting examples, include, but are not limited to: usernames, passwords, fingerprints, retinal scans, and other methods of authentication. One or more of these login credentials can be used by |

| | |
|---|---|
| | the access control system to identify and authenticate authorized users or registered customers and allow or deny access. |
| Login | The use of login credentials by an authorized user or registered customer that are necessary to access a restricted access system or rewards tracking program. |
| Login Session | A period of activity during which an authorized user or registered customer is logged in, which is ended when either the user logs out or is automatically logged out of a system. |
| Restricted Access System | A computer system secured by an access control system in order to limit who may access the system. |
| System Administrator | The person(s) responsible for the security of a computer system. |
| Tailgating | When an unauthorized person accesses a restricted access system or rewards tracking program by using a terminal which an authorized user or registered customer is logged into. |
| Terminal | Any device used to access a restricted access system or rewards tracking program. |
| Wireless Receiver | A device which detects signals or transmissions (or the absence of signals) from a Wireless Transmitter. This device can measure the strength of a signal in order to determine the proximity of a wireless transmitter. Alternatively, the wireless receiver can be provided with hardware/software, electronics, circuitry, technology, etc. to make the signal strength determination on its own. The wireless receiver can be in electrical communication with the access control system and can either forward the received signal or transmissions and/or any determinations it makes on its own to the access control system for further processing. |
| Wireless Transmitter | A device which transmits a digital or electronic code or signal unique to an authorized user or registered user. The method of transmission can include, but is not limited to, Bluetooth and other long or short-range frequencies transmission techniques now known or later developed. |

DETAILED DESCRIPTION

Figure 1:
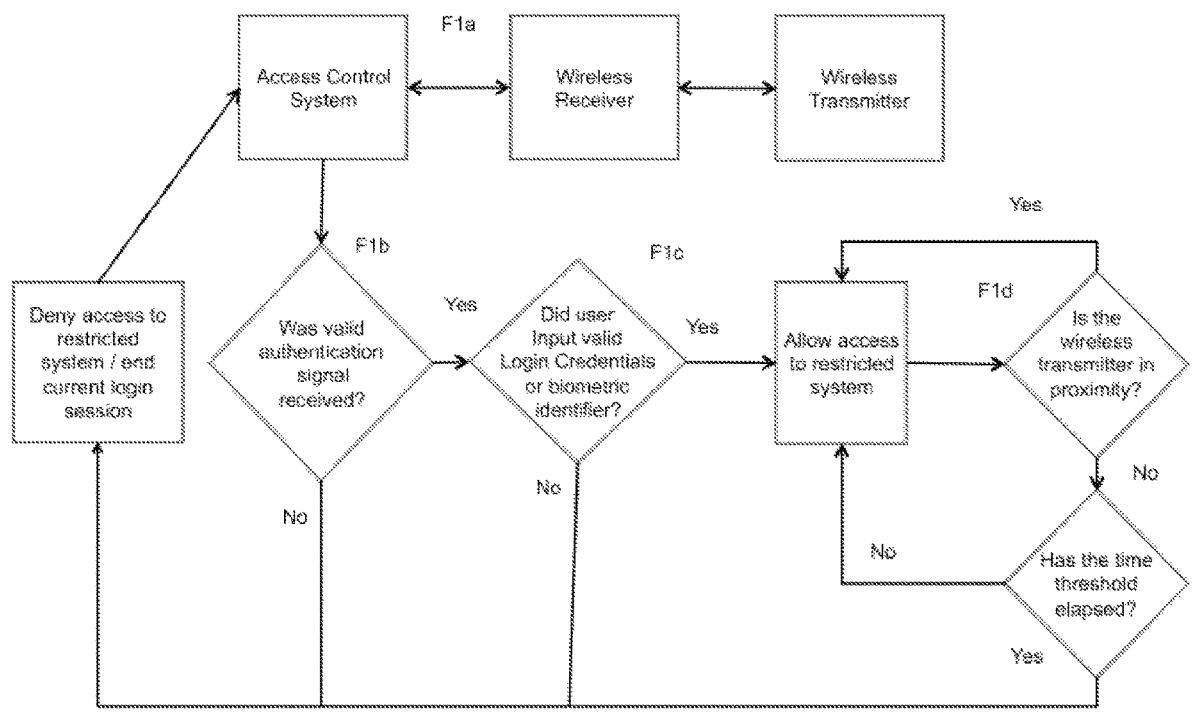
FIG. 1 is a block diagram and flowchart for automatically permitting and terminating access to a restricted access computer system in accordance with the disclosure.

FIG. 1 shows the workflow for utilizing a wireless transmitter in communication with a wireless receiver and access control system to prevent or reduce unauthorized access to restricted access computer systems. The wireless transmitter can be in communication with an access control system to prevent or reduce unauthorized access to restricted access computer systems.

At F1a, an access control file of the access control system retains and/or contains the records of authorized users for the restricted access system and their associated credentials and authentication signals. All authorized users can possess a relatively small wireless transmitter that either automatically and/or constantly transmits an authentication signal through short and/or long-range frequencies including but not limited to NFC, Bluetooth, RF and WiFi, or allows the user to send such an authentication signal through some action of the user. Alternatively, the user's cell phone or other electronic device can be programmed to transmit, preferably automatically, the authentication signal, such as through an app downloaded onto the cell phone or electronic device. The access control system is connected to or otherwise in communication with a wireless receiver programmed to receive these authentication signals from the user's wireless transmitter, cell phone, electronic device, etc (collectively referred to as "wireless transmitting device").

At F1b, to log into a secured system, such as a restricted access system, an authorized user approaches the access terminal and utilizing the wireless transmitter or user's cell phone, makes contact or comes into close enough proximity with a wireless receiver programmed to receive the authentication signals. The user may also be required to remain in such close proximity to the wireless receiver for a minimum duration in order for the authentication to occur. If an authentication signal is not received, access to the system will continue to be denied.

At F1c, optionally, once a valid authentication signal is received, the system can request that the user provide additional credentials or identification such as having a user type in his or her credentials at an access terminal, biometric identification (iris, retina, fingerprint, palm vein, DNA sample or other biometric identifier) prior to granting access. If valid credentials and/or biometric identifiers are provided, the user will be granted access to the system. If the credentials or biometric identifiers are not valid, the login process is terminated and access to the system is denied. This step can be optional.

At step F1d, once an authorized user is logged in, if the authentication signal's strength between the wireless transmitter/user's cell phone and the wireless receiver drops below the configurable signal strength threshold for longer than the configurable, predetermined and/or preprogrammed time threshold programmed in the access control system, the user's login session is terminated and he or she must log in again using the steps described above. The system can be configured in such a manner as to define which specific wireless signal type(s) must fall below the configurable signal strength and duration to initiate a log out event. As a non-limiting example, NFC, Bluetooth and RF signals may be configured to work for the login authentication but WiFi and Bluetooth only for the logout process.

Figure 2:
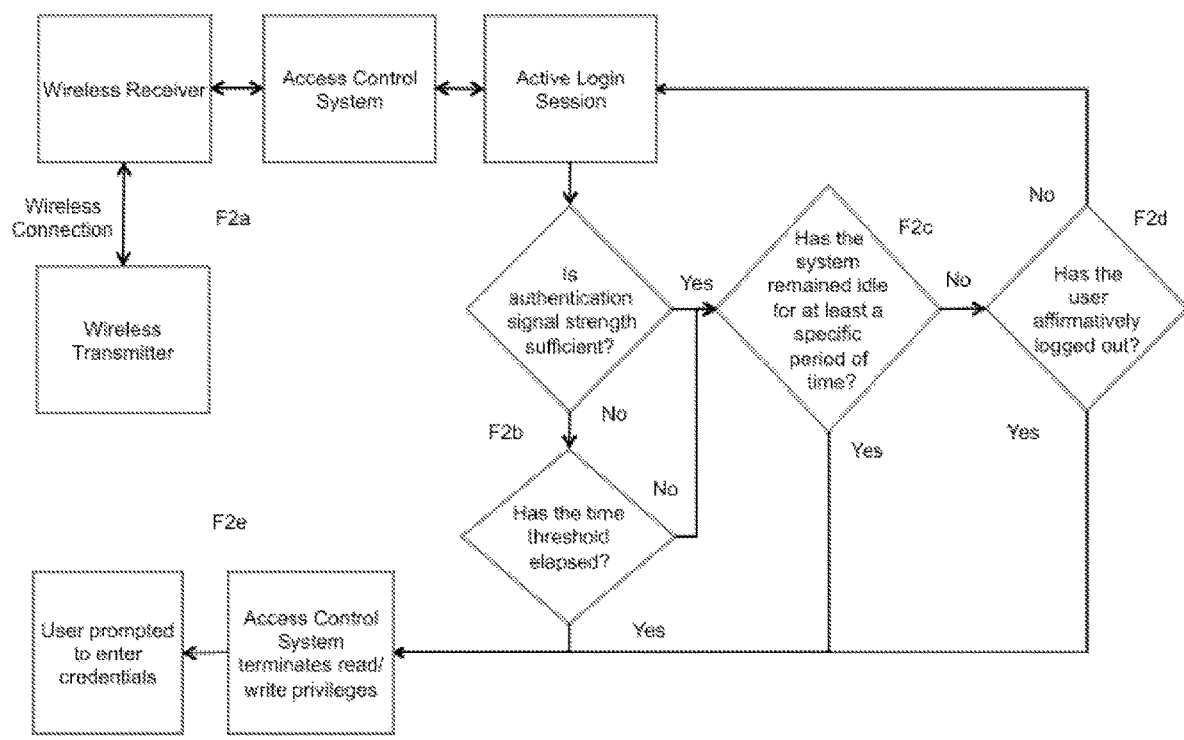
FIG. 2 is another block diagram and flowchart for automatically permitting and terminating access to a restricted access computer system.

FIG. 2 shows the workflow for automatically terminating an active login session based on failing to receiving any signal or a strong enough signal from a wireless transmitter in communication with an access control system.

At F2a and as described in FIG. 1, an access control file of the access control system retains the records of authorized users and their associated credentials and authentication signals. All authorized users can posses a small wireless transmitter constantly transmitting an authentication signal through short or long-range frequencies. Alternatively, the user's cell phone or other electronic device can be programmed to transmit the authentication signal, such as through an app downloaded onto the cell phone or electronic device. The access control system is connected to or otherwise in communication with a wireless receiver programmed to receive these authentication signals.

At F2b, an active login session can be terminated through three preferred non-limiting methods/conditions. First, the access control system will automatically sign an authorized user off when they leave a configurable area around the device for the configurable length of time. If the wireless receiver detects that user's authentication signal transmitted from the wireless transmitter is below the configurable, predetermined and/or preprogrammed signal strength threshold programmed in the access control system for longer than the configurable or predetermined or preprogrammed time threshold programmed in the access control system, the user's login session is terminated and he or she must log in again using the steps described in FIG. 1. The system can be configured in such a manner as to define which specific wireless signal type(s) must fall below the configurable signal strength and duration to initiate a log out event. As a non-limiting example, NFC, Bluetooth and RF signals may be configured to work for the login authentication but WiFi and Bluetooth only for the logout process. The termination procedure is described in F2e.

At F2c, the second method by which an active login session can be terminated is through user inactivity. If the authorized user does not enter any commands into the access terminal for a configurable, predetermine and/or preprogrammed length of time, the access control system can terminate the authorized user's login session and he or she must log in again using the steps described in FIG. 1. There can be at least two different inactivity/idle scenarios. In a first idle scenario the authorized user signal strength is sufficient. Here if there is predetermined/preprogrammed/ preconfigured period of inactivity/idleness the access control system can be programmed to automatically logout the user. In a second idle scenario the authorized user signal strength is not sufficient, but the predetermined period of time for the signal not being sufficient has not been reached for the system to automatically logout the authorized user (i.e. through the first method of automatic logout discussed above). In the second scenario again after a period of inactivity/idle (which can be a shorter period of time then the time for an insufficient signal strength), the system can be programmed to automatically logout the user. The length of time for inactivity before automatic logout can be longer for the first idle scenario as compared to second idle scenario. In either scenario, the termination procedure is described in F2e.

At F2d, another method by which an active login session can be terminated is through an affirmative step taken by the user. Non-limiting examples, include, but are not limited to: clicking a sign-off button on the access terminal, typing a sign-off command into the access terminal, tapping an RFID badge, and other methods of logging out. One or more of these sign-out procedures allow the access control system to terminate user access to a secured access system.

At F2e, if any of the logout procedures described in F2b-F2d occur, the access control system can terminate all read/write access to the secured access system. The terminal can be reset to a login screen, and a user must then enter login credentials to gain or regain access to the secured access system or begin the process described in FIG. 1 again.

The access control system can either be a separate electronic device connected to the restricted access computer system or software (and potentially hardware) installed directly on the restricted access computer system. In the separate electronic device scenario/configuration, the access control system can connect to the restricted access computer system via network (TCPIP), wireless (NFC/BLE/Etc.) or physical cable connection (USB/Serial/Parallel/Thunderbolt/Etc.). For the integrated scenario, the access control system software can be installed on the restricted access computer system and possibly include some hardware such as, but not limited to, a wireless receiver dongle or card.

The access control system can perform the automatic logout processes in one of several different ways, which include, without limitation:

1. Electronically and automatically sending a signal/ command to the restricted access control system to initiate a logout (i.e. send a remote command to login/logout through the operating system command capabilities such as, but not limited to, "logoff \[/n\] \[/f\]" or "logoff.vbs/ s<servername>/u<username>/w<password>/f");

2. Electronically and automatically executing a script on the restricted access computer system to allow for login/ logout (i.e. a preprogrammed macro, batch file or exe to perform the logout action); or 3. Electronically and automatically initiate a login event on a different restricted access computer system (or its own built in system), thus terminating the other session by way of network security protocols that only allow a single sign-in at a time on networked computers.

Figure 3:
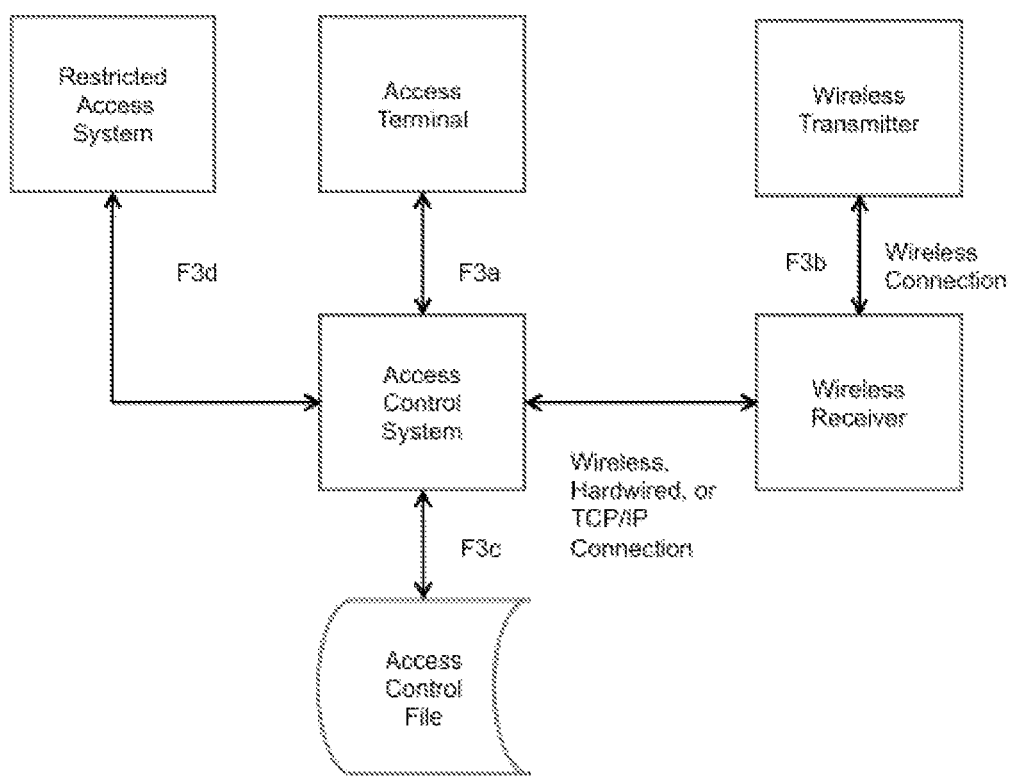
FIG. 3 is block diagram of the primary components for one embodiment of the system of the present disclosure and illustrates how such components can communicate with each other in one non-limiting embodiment.

FIG. 3 illustrates the various components that can be used in practicing the above described method and how they can communicate with each other.

At F3a, the access terminal can be a physical computer or electronic device where an authorized user can access a restricted access system. A user approaches the access terminal and is utilizing a wireless transmitter or cell phone that is transmitting the authentication signal.

At F3b, the wireless transmitter preferably continuously sends out an authentication signal unique to that user's login credentials for receipt by the wireless receiver. This signal is broadcasted or transmitted by a long or short range frequency transmission technology including, but not limited to, Bluetooth, NFC, WiFi, RF, or by other preferably wireless transmission technology now known or later developed.

The access control system, which can be in communication with the wireless receiver, preferably does not permit an authorized user to attempt to login to the system unless the correct authentication signal for the authorized user is received by the wireless receiver and detected by the access control system. The system may also require that the wireless transmitter makes contact or comes into close enough proximity with a wireless receiver programmed to receive the authentication signals and optionally must remain in such close proximity to the wireless receiver for a minimum duration in order for the authentication to occur. Additionally multi-factor identification and security measures such as having a user type in his or her credentials at an access terminal, biometric identification (iris, retina, fingerprint, palm vein, DNA sample or other biometric identifier), or any other login mechanism now developed or developed in the future may be required for access at this time.

At F3c, the access control system compares the credentials or other biometric information the user has inputted to those in an electronic file where credentials for authorized users are stored and maintained. If a user enters valid login credentials, and the wireless receiver detects the requisite authorization signal's strength above the minimum threshold, then access to the restricted access system is granted. If any of these conditions are not met, then access is denied. Additionally, if the user inputs invalid credentials or biometrics in general, and/or the credentials or biometrics entered, though proper, do not match the credentials or biometrics for the user associated with the received authorized signal, access to the system is denied.

The system can be programmed to allow the user another attempt to login or can be programmed to be locked for a predetermined or preprogrammed period of time. The system can also be programmed to be locked after a certain predetermined or preprogrammed number of successive login failure attempts. The system can also be programmed to unlock after a certain predetermined or preprogrammed period of time to allow further login attempts.

The access control system can also be programmed to automatically take a digital picture or video through a webcam or other digital camera at the access terminal or otherwise obtain a digital image of the individual at the access terminal, if the system detects key strokes while the signal strength is below the required predetermined threshold level but the predetermined length of time has not been reached such that the access has not yet been terminated. This feature will allow the system administrator, law enforcement, authorities, etc. to have a digital image or video of any person who was accessing the restricted access system at the access terminal while the authorized user was away but prior to the access control system automatically terminating access through the above described steps. Additionally, the actual keystrokes entered by the person can also be recorded or otherwise saved by the access control system in order to create a record of what the person was attempting to access. Digital images and/or video can also be taken/recorded for invalid access attempts of the individual attempting to access the restricted access system.

At F3d, after a successful login, any active login session can be terminated if the wireless receiver does not detect/receive the proper authentication signal or if the signal strength drops below the configurable or predetermined/preprogrammed signal strength threshold for longer than the configurable or predetermined/preprogrammed time threshold for a configured type of wireless signal. This method allows the access control system to determine that an authorized user has left the proximity of the access terminal and to end that user's session if they do not return within a predetermined length of time.

Figure 4:
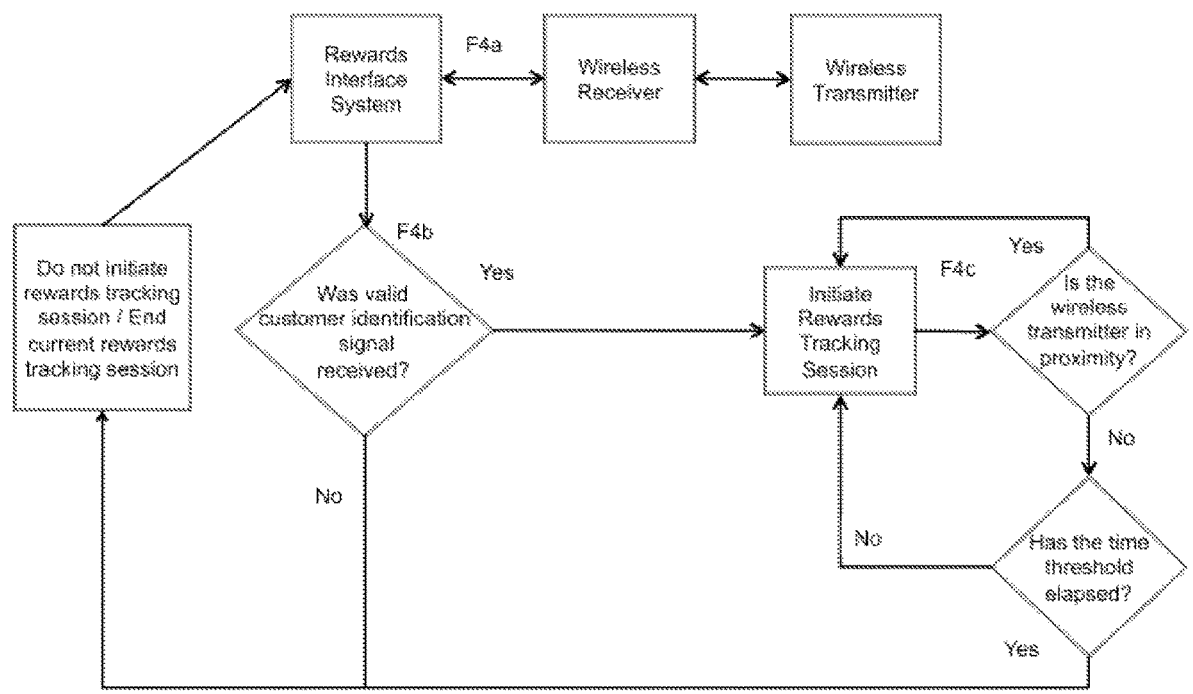
FIG. 4 is a block diagram and flowchart for automatically permitting and terminating access to a rewards tracking system.

FIG. 4 illustrates using a wireless transmitter in communication with a rewards interface system to initiate rewards tracking session on company systems. The workflow for using the wireless transmitter in communication with a wireless receiver and rewards interface system to initiate rewards tracking sessions is shown.

At F4a a customer identification file of a rewards interface system retains and/or contains the records of registered customers for the rewards program and their associated demographic information and identification signals. All registered customers can possess a relatively small wireless transmitter that either automatically and/or constantly transmits an identification signal through short and/or long-range frequencies including but not limited to NFC, Bluetooth, RF and WiFi, or allows the customer to send such an identification signal through some action of the customer. Alternatively, the customer's cell phone or other electronic device can be programmed to transmit, preferably automatically, the identification signal, such as through an app downloaded onto the cell phone or electronic device. The rewards interface system can be preferably connected to or otherwise in communication with a wireless receiver programmed to receive these identification signals from the customer's wireless transmitter, cell phone, electronic device, etc (collectively referred to as "wireless transmitting device").

At F4b, to initiate a rewards tracking session in a company's system, a registered customer approaches the access terminal and utilizing the wireless transmitter or customer's cell phone, makes contact or comes into close enough proximity with a wireless receiver programmed to receive the identification signal(s). The customer may also be required to remain in such close proximity to the wireless receiver for a minimum duration in order for the authentication to occur. If an identification signal is not received, access to the system will continue to be denied.

At step F4c, once a registered customer is identified and a rewards tracking session initiated, if the identification signal's strength between the wireless transmitter/customer's cell phone and the wireless receiver drops below the configurable signal strength threshold for longer than the configurable, predetermined and/or preprogrammed time threshold programmed in the rewards interface system, the customer's rewards tracking session is terminated and he or she must initiate a new rewards tracking session using the steps described above. The system can be configured in such a manner as to define which specific wireless signal type(s) must fall below the configurable signal strength and duration to initiate a rewards tracking session termination event. As a non-limiting example, NFC, Bluetooth and RF signals may be configured to work for the initiation of a rewards tracking session but WiFi and Bluetooth only for the termination process.

Figure 5:
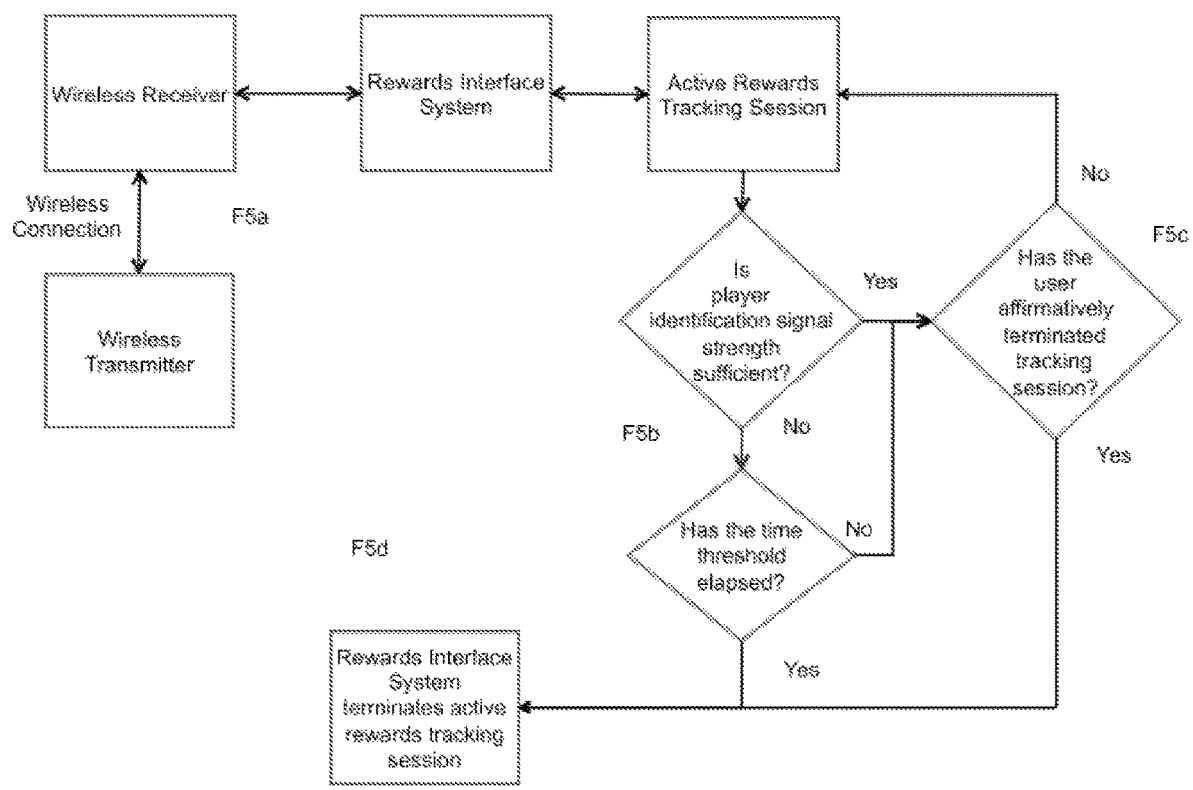
FIG. 5 is another block diagram and flowchart for automatically permitting and terminating access to a rewards tracking system.

FIG. 5 illustrates automatically terminating a rewards tracking session in view of a failure to receive any signal or a strong enough signal from a wireless transmitter in communication with the rewards interface system. The workflow is shown for automatically terminating an active rewards tracking session based on failing to receiving any signal or a strong enough signal from the wireless transmitter in communication with the rewards interface system.

At F5a and as described in FIG. 4, a customer identification file of the rewards interface system retains the records of registered customers for the rewards program and their associated demographic information and identification signals. All registered customers can possess a small wireless transmitter that either constantly transmits an identification signal through short and/or long-range frequencies including but not limited to NFC, Bluetooth, RF and WiFi, or allows the customer to send such an identification signal through some action of the customer. Alternatively, the user's cell phone or other electronic device can be programmed to transmit the identification signal, such as through an app downloaded onto the cell phone or electronic device. The rewards interface system is connected to or otherwise in communication with a wireless receiver programmed to receive these identification signals from the customer's wireless transmitter, cell phone, electronic device, etc (collectively referred to as "wireless transmitting device").

At F5b, an active rewards tracking session can be terminated through two preferred non-limiting methods/conditions. First, the rewards interface system will automatically terminate a customers' rewards tracking session when they leave a configurable area around the device for the configurable length of time. If the wireless receiver detects that customer's identification signal transmitted from the wireless transmitter is below the configurable, predetermined and/or preprogrammed signal strength threshold programmed in the rewards interface system for longer than the configurable or predetermined or preprogrammed time threshold programmed in the rewards interface system, the customer's rewards tracking session is terminated and he or she must initiate a new rewards tracking session using the steps described in FIG. 4. The system can be configured in such a manner as to define which specific wireless signal type(s) must fall below the configurable signal strength and duration to initiate a session termination event. As a non-limiting example, NFC, Bluetooth and RF signals may be configured to work for the initiation of a rewards tracking session but WiFi and Bluetooth only for termination process. The termination procedure is described in F2e and F5d.

At F5c, the second method by which an active rewards tracking session can be terminated is through an affirmative step taken by the customer. Non-limiting examples, include, but are not limited to: pressing a termination button on the machine, repeating the process in FIG. 4 to initiate a rewards tracking session and other methods of terminating a rewards tracking session. One or more of these sign-out procedures allow the rewards interface system to terminate a customer's active rewards tracking session.

At F5d, if any of the rewards tracking session termination procedures described in F5b-F5c occur, the rewards interface system can terminate all active rewards tracking sessions for a given customer.

Figure 6:
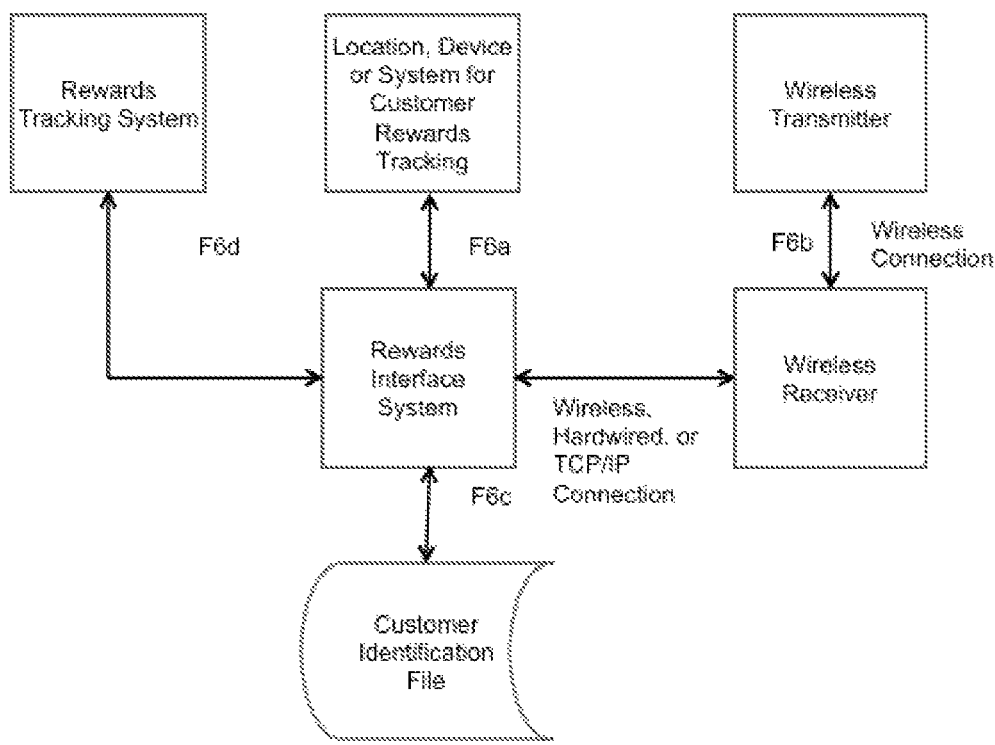
FIG. 6 is a block diagram of the primary components for one embodiment of the system when used with a rewards tracking system and illustrates how such components can communicate with each other in one non-limiting embodiment.

FIG. 6 illustrates the various components that can be used in practicing the above described method and how they can communicate with each other.

At F6a, the location, device or system for customer rewards tracking can be a physical computer, electronic device, gaming machine, physical location, etc. where a registered customer can earn rewards program points or units. A registered customer approaches the location, device or system for customer rewards tracking and possesses a wireless transmitter or cell phone that is transmitting the identification signal for the customer.

At F6b, the wireless transmitter preferably continuously sends out an identification signal unique to that registered customer for receipt by the wireless receiver. This signal is broadcasted or transmitted by a long or short range frequency transmission technology including, but not limited to, Bluetooth, NFC, WiFi, RF, or by other preferably wireless transmission technology now known or later developed.

The rewards interface system, which can be in communication with the wireless receiver, preferably does not initiate a rewards tracking session unless the correct identification signal for the registered customer is received by the wireless receiver and detected by the rewards interface system. The system may also require that the wireless transmitter makes contact or comes into close enough proximity with a wireless receiver programmed to receive the identification signals and optionally must remain in such close proximity to the wireless receiver for a minimum duration in order for the identification to occur.

At F6c, the rewards tracking system compares the identification signal contents received to the customer identification file where information for registered customers are stored and maintained. If valid customer identification is received, and the wireless receiver detects the requisite authorization signal's strength above the minimum threshold, then a rewards tracking session is initiated. If any of these conditions are not met, then the rewards tracking session is not initiated. Additionally, if the customer identification signal received for a registered customer does not match the information contained in the customer identification file, a rewards tracking session is not initiated.

At F6d, after a successful rewards tracking session initiation, any active session can be terminated if the wireless receiver does not detect/receive the proper identification signal or if the signal strength drops below the configurable or predetermined/preprogrammed signal strength threshold for longer than the configurable or predetermined/preprogrammed time threshold for a configured type of wireless signal. This method allows the rewards tracking system to determine that a registered customer has left the proximity of the wireless receiver and to end that customer's session if they do not return within a predetermined length of time.

Figure 7:
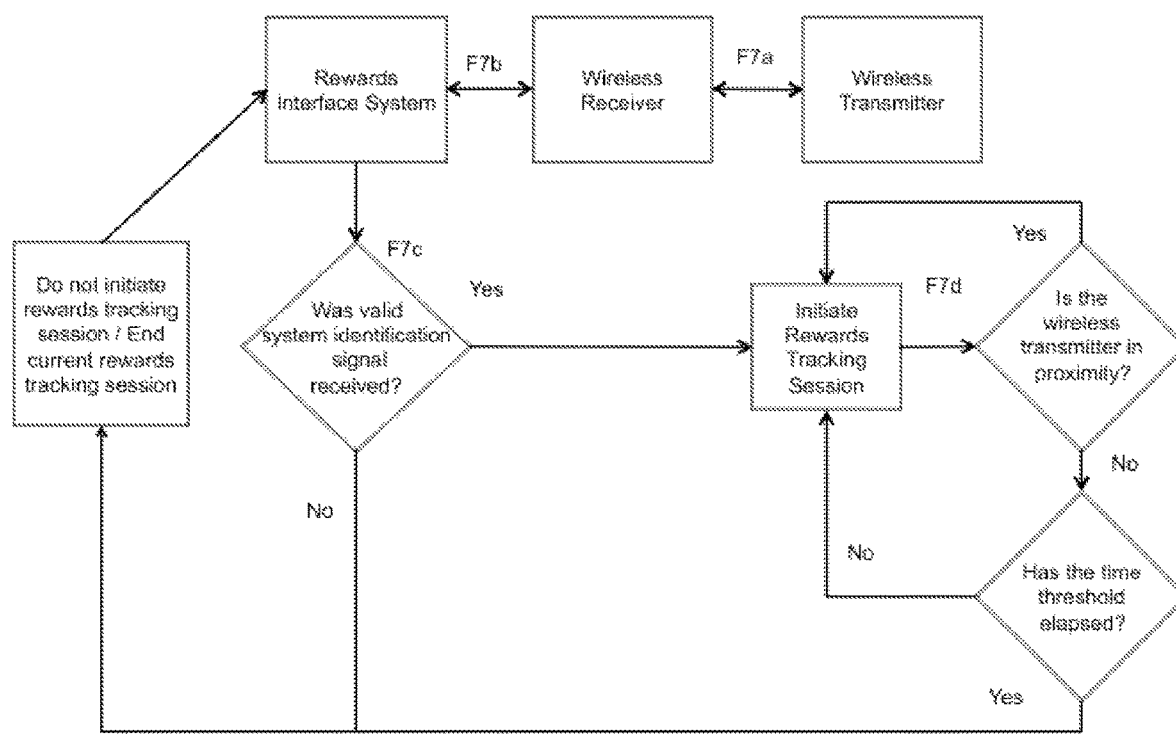
FIG. 7 is a block diagram and flowchart illustrating using a wireless transmitter in communication with a rewards interface system to initiate rewards tracking session in one non-limiting embodiment.

FIG. 7 shows an alternative workflow for utilizing a wireless transmitter in communication with a wireless receiver and rewards interface system to initiate rewards tracking sessions, such as, on a company system, though such is not considered limiting.

A system/location identification file of the rewards interface system retains the records of registered systems and locations for the rewards program and their associated identification signals. At F7a., all locations and systems to be interacted with by a customer including but not limited to Slot Machines, Video Poker machines and gaming tables, are fitted with a wireless transmitter that constantly transmits an identification signal through short and/or long-range frequencies including, but not limited to, NFC, Bluetooth, RF and WiFi.

A customer identification file of the rewards interface system retains the records of registered customers for the rewards program and their associated demographic information and identification signals. All registered customers can posses a small wireless receiver that constantly scans for an identification signal through short and/or long-range frequencies including but not limited to NFC, Bluetooth, RF and WiFi. Alternatively, the customer's cell phone or other electronic device can be programmed to scan for and receive the identification signal, such as through an app downloaded onto the cell phone or electronic device. At F5b, the rewards interface system is connected to or otherwise in communication with the customer's wireless receiver, cell phone, electronic device, etc and is programmed to receive these identification signals.

At F7c, to initiate a rewards tracking session in a company's system, a registered customer approaches the access terminal and utilizing the wireless receiver or customer's cell phone, makes contact or comes into close enough proximity with a location or system's wireless transmitter programmed to transmit the identification signals. The customer may also be required to remain in such close proximity to the wireless transmitter for a minimum duration in order for the authentication to occur. If an identification signal is not received or received at too low of a signal strength and/or not received for the minimum duration, no further action will be taken.

At F7d, once an registered customer is identified and associated with a registered location or system, and a rewards tracking session initiated, if the identification signal's strength between the wireless transmitter and wireless receiver/customer's cell phone drops below the configurable signal strength threshold for longer than the configurable, predetermined and/or preprogrammed time threshold programmed in the rewards interface system, the customer's rewards tracking session is automatically terminated by the system and he or she must initiate a new rewards tracking session using the steps described above. The system can be configured in such a manner as to define which specific wireless signal type(s) must fall below the configurable signal strength and duration to automatically initiate a rewards tracking session termination event. As a non-limiting example, NFC, Bluetooth and RF signals may be configured to work for the initiation of a rewards tracking session but WiFi and Bluetooth only for the termination process. While the use of a duration for session termination is preferable, it is not required for the system to function.

Figure 8:
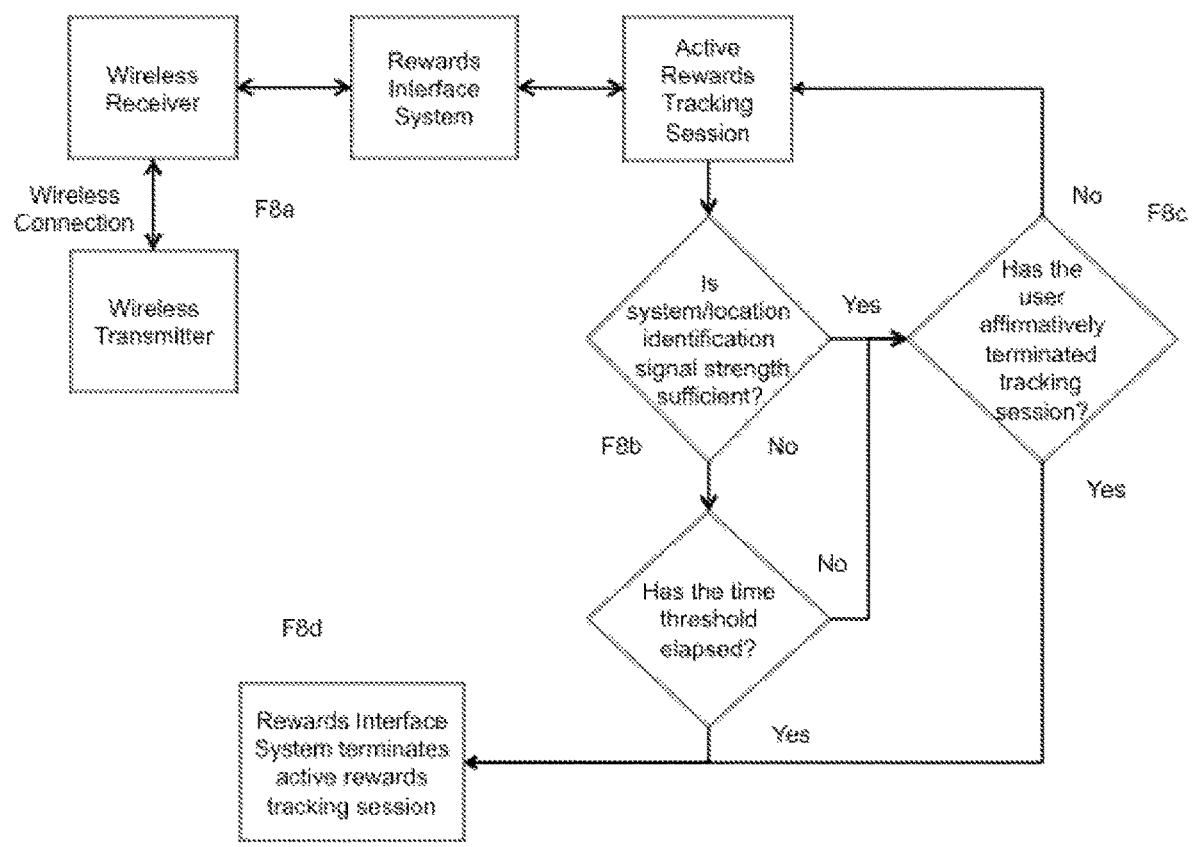
FIG. 8 is a block diagram and flowchart illustrating one non-limiting embodiment for terminating a rewards track session.

FIG. 8 shows the workflow for automatically terminating an active rewards tracking session based on a wireless receiver in communication with a rewards interface system failing to receive any signal or a strong enough signal from a wireless transmitter.

As described in FIG. 7, customer identification file of the rewards interface system retains the records of registered customers for the rewards program and their associated demographic information as well as all registered locations and systems assigned identification signals. All registered customers can posses a small wireless receiver that either constantly scans for an identification signal through short and/or long-range frequencies including, but not limited to, NFC, Bluetooth, RF and WiFi, or allows the customer to receiver such an identification signal through some action of the customer. Alternatively, the user's cell phone or other electronic device can be programmed to receive the identification signal, such as through an app downloaded onto the cell phone or electronic device. At F8a, the registered locations or systems have wireless transmitters affixed, transmitting their unique identification signal(s). The rewards interface system is connected to or otherwise in communication with the customer's wireless receiver, cell phone, electronic device, etc (collectively referred to as "wireless receiving device") programmed to receive the location and system identification signals from wireless transmitters.

At F8b, an active rewards tracking session can be terminated through two preferred, though non-limiting, methods/conditions. First, the rewards interface system can automatically terminate a customers' rewards tracking session when they leave a configurable area around the system or location for the configurable length of time. If the customer's wireless receiver detects that system or location's identification signal transmitted from the wireless transmitter is below the configurable, predetermined and/or preprogrammed signal strength threshold programmed in the rewards interface system for longer than the configurable or predetermined or preprogrammed time threshold programmed in the rewards interface system, the customer's rewards tracking session is automatically terminated by the system and he or she must initiate a new rewards tracking session using the steps described in FIG. 7. The system can be configured in such a manner as to define which specific wireless signal type(s) must fall below the configurable signal strength and duration to initiate a session termination event. As a non-limiting example, NFC, Bluetooth and RF signals may be configured to work for the initiation of a rewards tracking session but WiFi and Bluetooth only for termination process. The termination procedure is described in the discussion of F7d for FIG. 7 above.

At F8c, the second preferred method by which an active rewards tracking session can be terminated is through an affirmative step taken by the customer. Non-limiting examples, include, but are not limited to: the customer pressing a termination button on the machine, repeating the process in FIG. 7 to initiate a rewards tracking session at another location (which can cause the system to automatically terminate the earlier rewards tracking session through programming of the system) and other methods of terminating a rewards tracking session. One or more of these sign-out procedures allow the rewards interface system to terminate a customer's active rewards tracking session.

At F8d, if any of the rewards tracking session termination procedures described in F8b-F8c occur, the rewards interface system can terminate all active rewards tracking sessions for a given customer.

Figure 9:
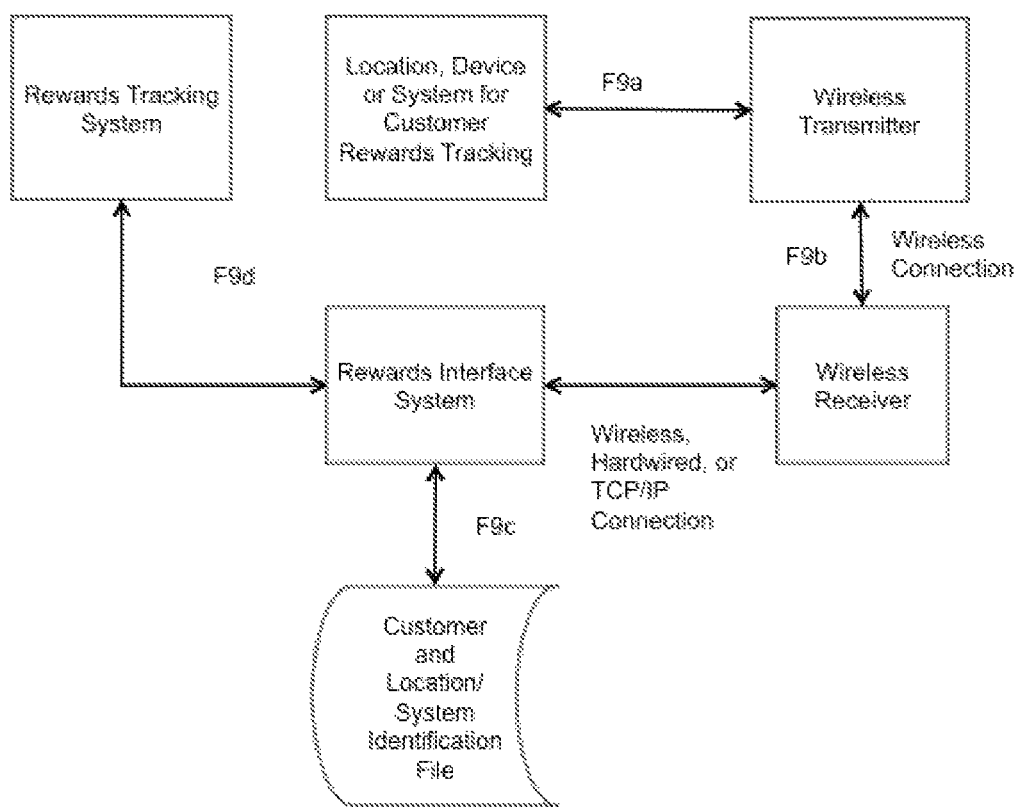
FIG. 9 is a non-limiting embodiment for at least some of the main components used for at least one of the methods described in the disclosure.

FIG. 9 illustrates another, non-limiting embodiment of the various components that can be used in practicing the above described method and how they can communicate with each other.

At F9a, the location, device or system for customer rewards tracking can be a physical computer, electronic device, gaming machine, physical location, cloud based and more where through tracking a registered customer can earn rewards program points or units. A registered customer approaches the location, device or system or communication component of the system utilizing a wireless transmitter and transmitting the identification signal for customer rewards tracking.

At F9b, the wireless transmitter preferably continuously sends out an identification signal unique to that system or location for receipt by the wireless receiver. This signal is broadcasted or transmitted by a long or short range frequency transmission technology including, but not limited to, Bluetooth, NFC, WiFi, RF, or by other preferably wireless transmission technology now known or later developed.

The rewards interface system, which can be in communication with the wireless receiver, preferably does not initiate a rewards tracking session unless the correct identification signal for the system or location is received by the wireless receiver associated with a registered customer and detected by the rewards interface system. The system may also require that the wireless transmitter makes contact or comes into close enough proximity with a wireless receiver programmed to receive the identification signals and optionally must remain in such close proximity to the wireless receiver for a minimum duration in order for the identification to occur.

At F9c, the rewards tracking system compares the identification signal contents received to the customer and location/system identification file(s) where information for registered location/systems and customers are stored and maintained. If valid location/system and customer identification is received, and the wireless receiver detects the requisite authorization signal's strength above the minimum threshold, then a rewards tracking session can be initiated. If any of these conditions are not met, then the rewards tracking session is preferably not initiated. Additionally, If the location/system or customer identification signal received for a registered location/system or customer does not match the information contained in the customer and location/system identification file, a rewards tracking session is preferably not initiated.

At F9d, after a successful rewards tracking session initiation, any active session can be terminated if the wireless receiver does not detect/receive the proper identification signal or if the signal strength drops below the configurable or predetermined/preprogrammed signal strength threshold for longer than the configurable or predetermined/preprogrammed time threshold for a configured type of wireless signal. This method allows the rewards tracking system to determine that a registered customer has left the proximity of the location/system and to end that customer's session if they do not return within a predetermined length of time.

Using a wireless transmitter and receiver to prevent or reduce the unauthorized access to restricted computer systems/reward tracking systems will provide significant security and financial benefits incident to computer systems in all industry sectors, including, but not limited to, the following benefits:

1. Prevention or reduction of unauthorized access and distribution of sensitive personal, financial, medical, and other data.
2. Prevention or reduction of crimes such as data and identity theft.
3. Allow system administrators greater control over access to sensitive data.
4. Allow system administrators to better identify individuals who have accessed restricted access systems.
5. Reduce administrative time spent by system administrators and security personnel in identifying persons who have accessed restricted systems.

It should be understood that the exemplary embodiments described herein should be considered in a descriptive sense only and not for purposes of limitation. Descriptions of features or aspects within each embodiment should typically be considered as available for other similar features or aspects in other embodiments. While one or more embodiments have been described with reference to the figures, it will be understood by those of ordinary skill in the art that various changes in form and details may be made therein without departing from their spirit and scope.

All components of the described system and their locations, electronic communication methods between the system components, electronic storage mechanisms, etc. discussed above or shown in the drawings, if any, are merely by way of example and are not considered limiting and other component(s) and their locations, electronic communication methods, electronic storage mechanisms, etc. can be chosen and used and all are considered within the scope of the disclosure.

Unless feature(s), part(s), component(s), characteristic(s) or function(s) described in the specification or shown in the drawings for a claim element, claim step or claim term specifically appear in the claim with the claim element, claim step or claim term, then the inventor does not consider such feature(s), part(s), component(s), characteristic(s) or function(s) to be included for the claim element, claim step or claim term in the claim when and if the claim element, claim step or claim term is interpreted or construed. Similarly, with respect to any "means for" elements in the claims, the inventor considers such language to require only the minimal amount of features, components, steps, or parts from the specification to achieve the function of the "means for" language and not all of the features, components, steps or parts describe in the specification that are related to the function of the "means for" language.

The benefits, advantages, solutions to problems, and any element(s) that may cause any benefit, advantage, or solution to occur or become more pronounced are not to be construed or considered as a critical, required, or essential features or elements of any or all the claims.

While the description has been disclosed in certain terms and has disclosed certain embodiments or modifications, persons skilled in the art who have acquainted themselves with the disclosure, will appreciate that it is not necessarily limited by such terms, nor to the specific embodiments and modification disclosed herein. Thus, a wide variety of alternatives, suggested by the teachings herein, can be practiced without departing from the spirit of the disclosure, and rights to such alternatives are particularly reserved and considered within the scope of the disclosure.

What is claimed is:

1. A computer-implemented method for protecting a rewards interface system or rewards tracking system from unauthorized access by automatically initiating a rewards tracking session on a rewards interface system only upon receipt of an authorized identification signal from an authorized customer and by subsequently automatically terminating the rewards tracking session that had previously been successfully initiated for the authorized customer when the customer leaves a vicinity of a specific gaming machine associated with the rewards tracking session, comprising the steps of:
(a) Electronically associating a wireless receiver to a specific gaming machine or gaming table located at a geographical location visited by a customer;
(b) Providing an application on a mobile electronic device possessed by the customer while at the geographical location for processing authentication or identification signals;
(c) Automatically generating a first authentication or identification signal;
(d) Wirelessly forwarding the first authentication or identification signal by the wireless transmitter associated with the mobile electronic device;
(e) Automatically receiving the first signal of a first wireless transmission technology having a complete authentication or identification by a wireless receiver;
(f) Electronically and wirelessly informing a rewards interface system that the first authentication or identification signal was received from the wireless transmitter, the rewards interface system in electrical communication with the wireless receiver and located separate from the wireless transmitter;
(g) confirming that the first authentication or identification signal is valid by the rewards interface system based on information previously stored in an electronic database or electronic file which is in communication with the rewards interface system;

(h) Automatically initiating a rewards tracking session for the customer by the rewards interface system where a valid determination was made by the rewards interface system in step (g);

(i) subsequent to initiating the rewards tracking session, automatically switching from detecting for a signal sent from the first wireless transmission technology by the rewards interface system in communication with the wireless receiver to detecting for a signal sent from a second wireless transmission technology by the rewards interface system in communication with the wireless receiver; wherein the first wireless transmission technology is a different signal technology from the second wireless transmission technology;

(j) Detecting by the rewards interface system in communication with the wireless receiver when the wireless receiver fails to receive a second session maintenance signal of the second wireless transmission technology from the wireless transmitter or when a received second session maintenance signal of the second wireless transmission technology from the wireless transmitter is below a preprogrammed authentication signal strength level;

(k) Determining by the rewards interface system a length of time that the second session maintenance signal was not received or below a preprogrammed signal strength level;

(l) Determining by the rewards interface system if the length of time determined in step (k) exceeds a previously preprogrammed length of time threshold; and (m) Automatically terminating the previously initiated rewards tracking session by the rewards interface system where the length of time detected by the rewards interface system in step (k) is determined to exceed the previously programmed length of time threshold in step (l) to aid in preventing unauthorized access to the rewards tracking system.

2. The computer-implemented method for protecting a rewards interface system from unauthorized access by automatically initiating a rewards tracking session of claim 1 wherein at least part of the confirming in step (h) comprises the step of detecting by a rewards interface system when the wireless receiver receives a first authentication or identification signal from the wireless transmitter above a preprogrammed authentication or identification signal strength level threshold.

3. The computer-implemented method for protecting a rewards interface system from unauthorized access by automatically initiating a rewards tracking session of claim 2 wherein at least part of the confirming step (h) comprises the step of determining by the rewards interface system that the wireless receiver continues to continuously receive the first authentication or identification signal above the signal strength threshold level from the wireless transmitter for a period of time.

4. The computer-implemented method for protecting a rewards interface system from unauthorized access by automatically initiating a rewards tracking session of claim 3 wherein the automatically initiating a rewards tracking session in step (h) is only performed where a length of time determined that the wireless receiver continuously received the first authentication or identification signal above the signal strength threshold level from the wireless transmitter exceeds a preprogrammed length of time threshold.

5. The computer-implemented method for protecting a rewards interface system from unauthorized access by automatically initiating a rewards tracking session of claim 1 wherein the first wireless transmission technology is a NFC or RFID technology and the second wireless transmission technology is a WiFi or Bluetooth technology.

6. The computer-implemented method for protecting a rewards interface system from unauthorized access by automatically initiating a rewards tracking session of claim 1 wherein the steps of detecting and terminating are based on one or more of the following events: (i) where the length of time determined exceeds a preprogrammed length of time; (ii) the authorized user associated with the active rewards tracking session physically presses a physical or virtual button, switch or other termination device on the specific gaming machine or gaming table to affirmatively terminate the rewards tracking session; or (iii) the authorized user initiates another rewards tracking session on a different gaming machine or gaming table.

7. The computer-implemented method for protecting a rewards interface system from unauthorized access by automatically initiating a rewards tracking session of claim 1 further comprising the step of determining by the rewards interface system whether any user activity is occurring on the specific gaming machine or gaming table where the authentication or identification signal is not received by the rewards interface system or is below a predetermined signal strength level threshold and a preprogrammed length of time has not been reached.

8. A computer-implemented system for protecting a rewards interface system from unauthorized access by automatically initiating a rewards tracking session for an authorized user for a specific gaming machine or gaming table only upon receipt of an authorized identification signal from the authorized user and automatically terminating an initiated rewards tracking session under certain conditions, comprising:

a wireless transmitter contained within a mobile electronic device possessed by the authorized user while the authorized user is at the geographical location, said wireless transmitter automatically continuously transmitting a signal having a complete authentication or identification at spaced apart intervals using a first wireless transmission technology prior to initiation of a rewards tracking session for the authorized user and said wireless transmitter transmitting a session maintenance signal using a second wireless transmission technology after the rewards tracking session is initiated;

a wireless receiver fitted or otherwise secured or associated with a specific gaming machine or gaming table disposed at a geographical location the wireless receiver in communication with the wireless transmitter when the authorized user is at or playing the specific gaming machine or gaming table and receives the authentication or identification signals from the wireless transmitter prior to initiation of the rewards tracking session and receives the session maintenance signal after the rewards tracking session is initiated;

a rewards interface system in communication with the wireless receiver;

an electronic database in communication with the rewards interface system;

wherein the rewards interface system programmed to automatically initiate a rewards tracking session for the authorized user for the specific gaming machine or gaming table where the rewards interface system determines that a valid authentication or identification signal was received by the wireless receiver from the wireless transmitter based on information stored in the electronic database;

wherein the rewards interface system programmed to automatically terminate an active rewards tracking session under certain conditions to aid in preventing unauthorized access to the rewards tracking system;

wherein the first wireless transmission technology is a different wireless transmission technology than the second wireless transmission technology.

9. The computer-implemented system for protecting a rewards interface system from unauthorized access of claim 8 wherein the certain conditions are one or more of the following events: (i) the wireless receiver fails to receive the session maintenance signal from the wireless transmitter; (ii) the received session maintenance authentication or identification signal from the wireless transmitter device falls below a preprogrammed signal strength level; (iii) the received session maintenance signal from the wireless transmitter device falls below a preprogrammed signal strength level for at least a preprogrammed period of time; (iv) the authorized user associated with the active rewards tracking session physically presses a physical or virtual button, switch or other termination device on the specific gaming machine or gaming table to affirmatively terminate the rewards tracking session; or (v) the authorized user initiates another rewards tracking session on a different gaming machine or gaming table.

10. A computer-implemented method for protecting a rewards tracking system from unauthorized access by automatically initiating and maintaining a rewards tracking session on the rewards interface system, comprising the steps of:

(a1) fitting a wireless receiver to a specific gaming machine or a gaming table located at a geographical location being visited or frequented by a customer;

(a2) scanning for and receiving a signal having a complete authentication or identification by the wireless receiver transmitted by a wireless transmitter of a mobile electronic device possessed by the customer using a short-range wireless protocol, the mobile electronic device running an App for transmitting the signal (b) electronically and wirelessly informing a rewards interface system that the authentication or identification signal from the wireless Transmitter has been received;

(c) confirming that the authentication or identification signal is valid by the rewards interface system based on information previously stored in an electronic database or electronic file which is in communication with the rewards interface system;

(d) initiating a rewards tracking session on the rewards tracking system for the customer by the rewards interface system where a valid determination was made by the rewards interface system in step (c);

(e) scanning for and receiving a location persistence signal by the wireless receiver using a medium to long-range wireless protocol and signal different from the authentication signal in step (a), the App running on the mobile electronic device initiating any transmission of the location persistence signal by the wireless transmitter;

(f) maintaining the rewards tracking session in an active state until the rewards interface system determines that a location persistence signal has not been received or a signal strength for the location persistence signal is below a preprogrammed threshold level; and (d) automatically terminating the rewards tracking session by the rewards interface system if one of the conditions in step (f) is met to aid in preventing unauthorized access to the rewards tracking system.

* * * * *